C. C. NEIMEISTER.
Car-Bumpers.

No. 207,435.  Patented Aug. 27, 1878.

Attest:
W. T. Baker
A. R. Ohlmann

INVENTOR:
Charles C. Neimeister
By L. B. Coupland & Co
Attorneys.

UNITED STATES PATENT OFFICE.

CHARLES C. NEIMEISTER, OF CHICAGO, ILLINOIS.

IMPROVEMENT IN CAR-BUMPERS.

Specification forming part of Letters Patent No. 207,435, dated August 27, 1878; application filed August 22, 1877.

*To all whom it may concern:*

Be it known that I, CHARLES C. NEIMEISTER, of the city of Chicago, in the county of Cook and State of Illinois, have made certain new and useful Improvements in Bumpers for Railroad-Cars; and I hereby declare the following to be a full, clear, and exact description thereof, reference being had to the accompanying drawing, forming a part of this specification, in which—

Figure 1:
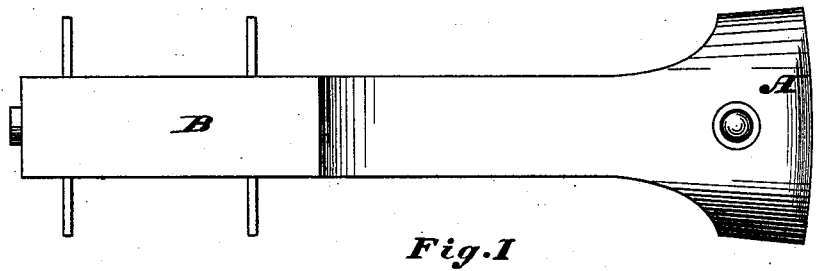
Figure 2:
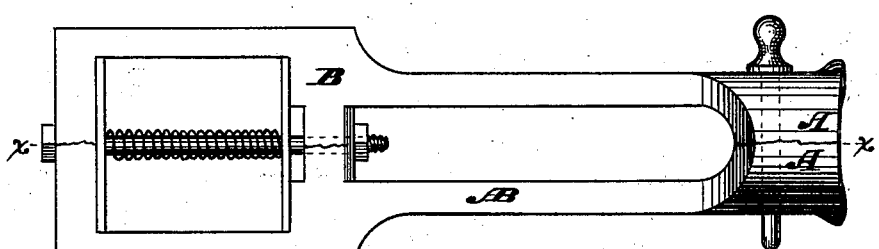
Figure 3:
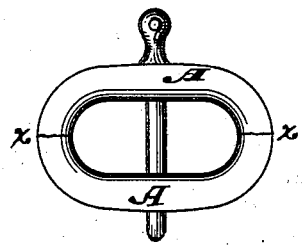

Figure 1 is a longitudinal view looking from above; Fig. 2, a longitudinal view looking from the side; Fig. 3, a view of the bumper-head looking from the end.

The object of my invention is to construct a car-bumper in such a manner as to impart greater durability to a device of this nature than any now in use.

Car-bumpers are necessarily subjected to exceedingly hard usage, and when made of wrought metal have always been found to fail at the points of weld. As heretofore constructed such bumpers have always had transverse welds or welded surfaces so large in area as to make it difficult to secure perfect union. These causes lead to quick destruction under the violent shocks to which the bumpers are subjected.

My invention consists in a bumper constructed of two forged parts curved in cross-section, so that each forms one-half of the bumper and coupler-socket, and welded along the side edges lengthwise, so that the surfaces welded are comparatively narrow, and are in the direction of the lines of strain to which the bumper is subjected.

In the manufacture of my improvement I proceed as follows: I construct the bumper-head A and draw-bar in two parts, the bumper end being semicircular in form. I then weld the two parts together on the sides, as shown on the line $x\ x$, Fig. 2. At this point I get the smallest welding-surface, and also am enabled at the same time to keep a continuous hot blast on the metal during the operation of welding the two halves together, thereby making a more perfect union of the parts. In this way I form my bumper in two plain pieces easy to forge, and unite them along lines where the united surfaces are easy to manage and secure certain union. The draw-pin passes through solid iron midway between the welded surfaces, and in such position as will insure an equal distribution of the draft-strains.

The bumper-shocks will be received upon the end of the bumper and at the end of the weld-joint, so that it will have the greatest power of resistance.

In the drawing, A represents the bumper-head, constructed as described; B, draw-bar, attached to bumper-head.

Having thus described my invention, what I claim as new and useful, and desire to secure by Letters Patent, is—

A wrought-metal rail-car bumper and draw-head forged in two parts, as described, the part A extended and curved laterally, and the edges welded along the lines $x\ x$ lengthwise of the bumper to form a coupler-socket, and the parts B extended longitudinally to form the shank or draw-bar, as and to the effect set forth.

CHARLES C. NEIMEISTER.

Witnesses:
L. B. COUPLAND,
A. DUNNING.